March 31, 1970 — R. BACH — 3,503,588
LANDING GEAR FOR SEMITRAILERS
Filed May 31, 1967 — 2 Sheets-Sheet 1
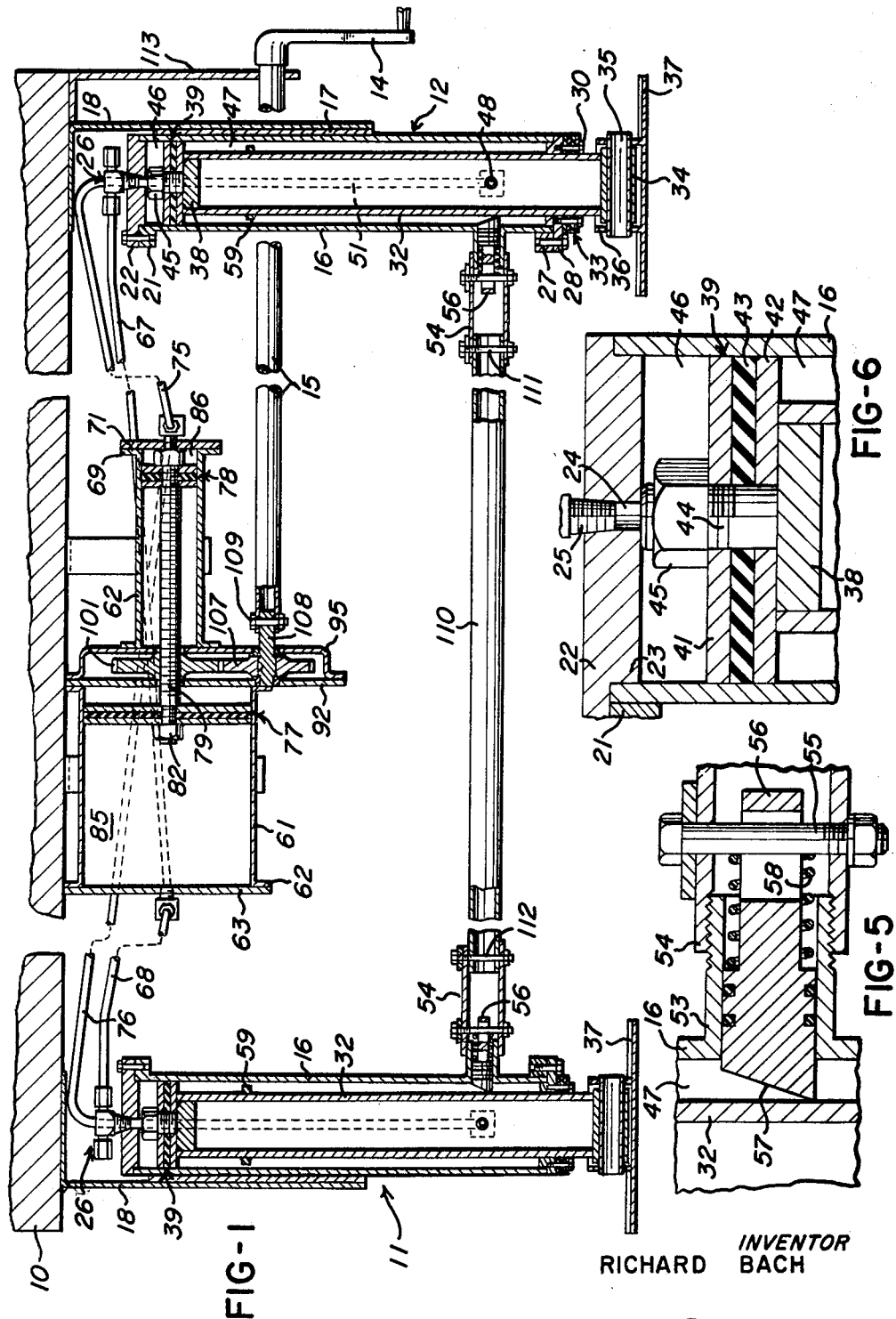
INVENTOR
RICHARD BACH
BY
HIS ATTORNEY

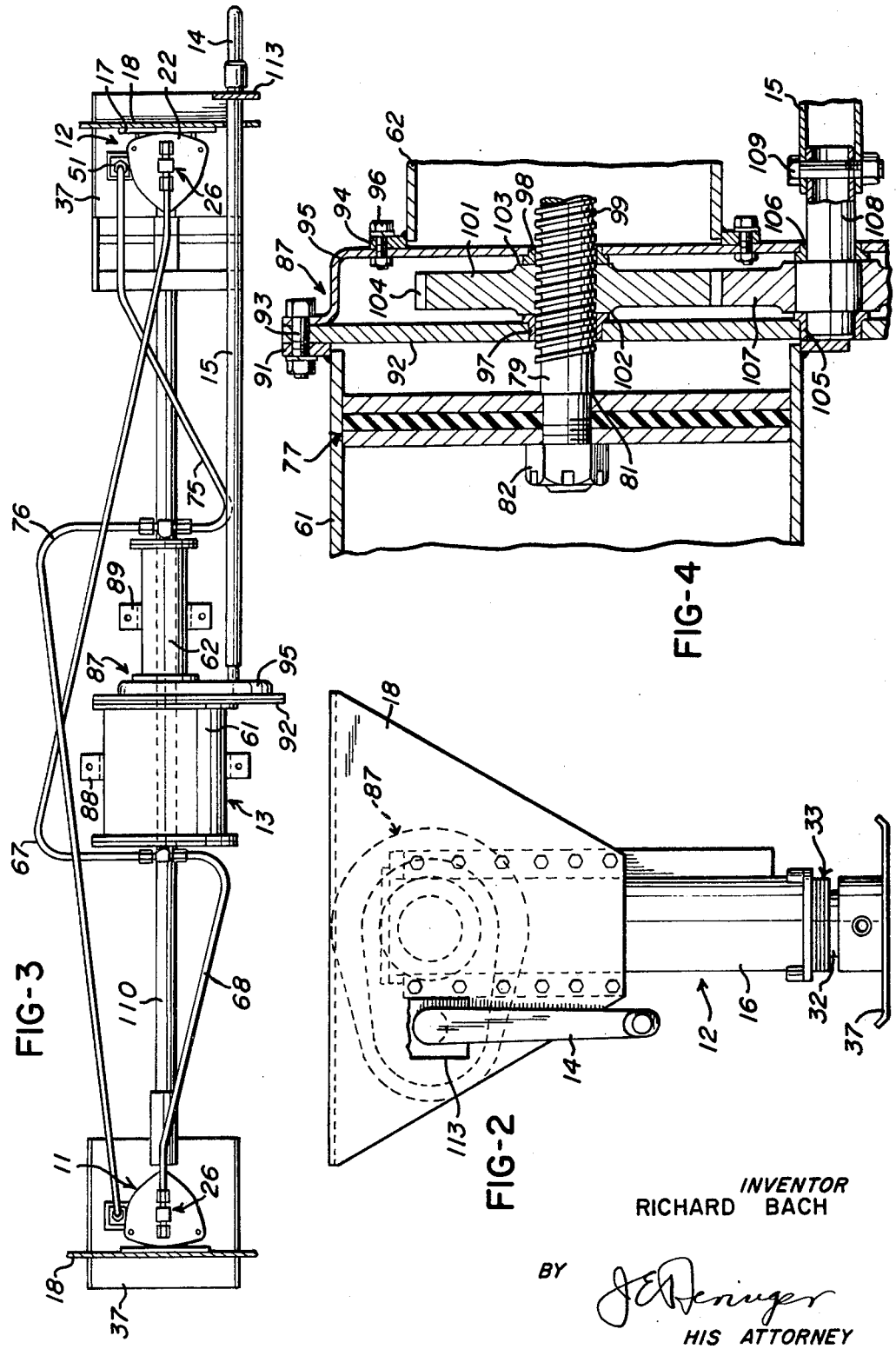

United States Patent Office 3,503,588
Patented Mar. 31, 1970

3,503,588
LANDING GEAR FOR SEMITRAILERS
Richard Bach, 243 Roberts St., West Carrolton, Ohio 44615, by Marcella R. Bach, administratrix of said Richard Bach, deceased
Filed May 31, 1967, Ser. No. 642,510
Int. Cl. B60s 9/02; F15b 7/00; F16h 27/02
U.S. Cl. 254—86
17 Claims

ABSTRACT OF THE DISCLOSURE

Landing gear for semitrailers wherein the landing gear legs are positively extended and retracted hydraulically, the hydraulic actuating means comprising double acting cylinder means and dual piston means selectively reciprocated in such cylinder means, the cylinder and piston means and a simplified means of effecting reciprocation being comprised in an integrated assembly supported beneath the trailer and accessible for remote operation.

This invention relates to landing gear for semitrailers, and the like, and particularly to hydraulic means for extending retracting such landing gear.

Although not so limited, the invention has particular reference to manually operated landing gear wherein a crank accessible from one side of the trailer is turned by hand to extend and to retract the landing gear, a particular object of the invention being to reduce the work load involved in such operation.

Another object of the invention is to provide a hydraulically actuated landing gear, all the components of which are mounted to the underside of the trailer body, it being an attendant object in this connection to provide landing gear components of such compact size and simplified construction and operation as to allow them to be mounted and operated in a conventional manner on and in connection with semitrailers.

A further object of the invention is to provide a generally new arrangement of hydraulic cylinders and of means for developing pressures therein alternately to affect cooperating hydraulic circuits.

Still another object of the invention is to provide generally new landing gear struts wherein opposing hydraulic circuits are separated in a unique manner and wherein simplified lock means is provided to prevent inadvertent retraction of extended legs.

Other objects and structural details of the invention will appear from the following description when read in connection with the accompanying drawings, wherein:

FIG. 1 is a view in longitudinal section of apparatus in accordance with the illustrated embodiment of the invention, shown installed to the underside of a semitrailer;

FIG. 2 is a side view in elevation of one landing gear leg assembly and its means of attachment to the trailer;

FIG. 3 is a top plan view of the apparatus as shown in FIG. 1, the semitrailer being omitted; and FIGS. 4 and 5 and 6 are fragmentary enlarged views of details of the landing gear.

The invention is illustratively disclosed as adapted for use as semitrailer landing gear apparatus although it will be evident that the concepts of hydraulic operation disclosed may be otherwise applicable. The trailer unit of a semitrailer suspends landing gear legs from its front end. These support the front end of the trailer at times when the tractor is detached for other use while the trailer independently is loaded and unloaded. Rigged for travel, that is with the trailer attached to a tractor, the landing gear legs are retracted to clear the road. The landing gear legs are extended and retracted as needed, and this is usually a manual operation, carried out by a hand crank accessible at one side of the trailer unit. Inasmuch as the full weight of one end of the trailer unit must be lifted, at least a short distance, when detaching the trailer from the tractor manual operation may involve substantial effort, even though mechanical advantage may be provided. As indicated above, an object of this invention is to make the operation of lifting the trailer unit, and of controlling its descent, easier to carry out.

A fragment 10 of the trailer body is shown in the drawings. Suspended therefrom in laterally spaced apart relation and on opposite sides of the major axis of the trailer body are landing gear legs 11 and 12. Also suspended from the trailer body 10, and intermediately disposed between the legs 11 and 12 is a hydraulic actuating unit 13. A crank arm 14 is positioned in generally underlying relation to the body 10, to one side thereof, and is connected by a transversely extending shaft 15 to the actuating unit 13. As will be seen, rotation of the crank 14 causes hydraulic forces to develop in unit 13 effecting simultaneous extending or retracting motions of legs 11 and 12, depending upon the direction of rotation of the crank.

The landing gear legs and their means of suspension from body 10 are identical so that a description of one will suffice for both. Thus, landing gear leg 12 comprises a cylinder 16 to which is secured, as by welding, an attachment plate 17. A bracket 18 is bolted to the plate 17 and at its upper end is turned over as a flange 19 to underlie and to be fastened to the body 10. The cylinder 16 accordingly is connected to body 10 in a rigid, downwardly projecting manner.

At the upper end of cylinder 16 a mounting ring 21 is attached serving as a means by which an end cap 22 may be fixed in a closing relation to the upper end of the cylinder. A central projecting portion 23 of the cap 22 is received in and closes the upper end of cylinder 16. The cap 22 is closed except for a relatively small diameter passage 24 extending longitudinally through the cap and which may in part be threaded to receive the stem 25 of a hydraulic fitting 26. The lower end of cylinder 16 is similarly flanged by an attachment ring 27 and a cap 28 having a central projecting boss 29 is bolted to the ring 27 in a manner to seat in and close the lower end of the cylinder. A relatively large diameter opening 31 in the cap 28 provides for passage therethrough of a tubular piston rod 32. A lower end of rod 32 extends through and beyond opening 31, having a substantially sliding fit in cap 28. Secured to the underside of cap 28, by bolts 30, is a sealing assembly 33 inhibiting an escape of pressure fluid from within cylinder 16 downward along the exterior of rod 32.

On the projecting lower end of piston rod 32 is attached a transverse tubular sleeve 34 providing a mounting for a pin 35. Projecting beyond opposite ends of the sleeve 34, the pin 35 is accommodated in radial holes in a cylindrical skirt 36, the lower end of which is made fast to a laterally expanded ground engaging plate acting as a foot.

The inner end of piston rod 32 lies within cylinder 16. An inserted plate 38 closes such inner end. The plate 38, along with the annular inner end of rod 32 acts as a seat for a piston head 39 in sliding contact with the inner wall of cylinder 16. The head 39 is comprised of upper and lower relatively rigid discs 41 and 42 between which is a relatively resilient deformable member 43 made of rubber or a rubber-like material. The piston head 39 has a central opening through which projects an externally threaded stud 44 on the insert plate 38, the stud 44 projecting upwardly through and beyond head 39. On the upwardly projecting extremity of the stud 44 is mounted a nut 45 in such screw threaded attachment to the stud as to hold the parts of the piston head 39 in an assembled relation and seated upon the inner extremity of piston rod 32. The stud 44, abutting the cap 22, provides a limit of inward movement of the piston rod 32. The described construction and arrangement of parts provides an interior space in cylinder 16 above piston head 39 which may be identified as a pressure chamber 46, being adapted to be supplied with fluid under pressure by way of passage 24 from fitting 26. Similarly, the annular space beneath piston head 39 may be considered as defining a pressure chamber 47. The chambers 46 and 47 are denied communication with one another by reason of the sealing engagement of member 43 with the interior wall of cylinder 16. It will be understood that the nut 45 clamps together the parts 41, 42 and 43 of the piston head 39 in a manner as to expand member 43 into relatively close fitting contact with the cylinder wall. Further, the application of fluid pressure forces within the cylinder are such as to supplement the clamping action applying a greater squeezing pressure to member 43 and thereby a greater radial thrust thereof against the cylinder wall. The chamber 47 is supplied with fluid under pressure by way of a lateral opening 48 in cylinder 16 toward the lower end thereof. A nozzle 49 is received in opening 48 from the exterior of the cylinder. A tube 51 supplies nozzle 48 and is disposed longitudinally of the cylinder in adjacent relation thereto, an upper end of the tube terminating in a fitting 52.

The lateral inlet opening 48 is spaced longitudinally from end cap 23 a distance greater than the permitted travel of piston head 39 within the cylinder. Accordingly, the opening 48 is always exclusively in contact with annular space 47 while passage 24 in cap 22 is exclusively in contact with space 46. As will be understood, a supply of pressure fluid to space 46 results in the assembly comprising rod 32, piston head 39 and foot 37, being extended relatively to cylinder 16, fluid in space 47 being expelled therefrom during this process by flowing out of the cylinder by way of opening 48. This is an extension of the hydraulic leg or strut which the described subject matter comprises. Retraction of the leg is a function of a reverse application of forces wherein the pressure in space 46 is released and fluid under pressure is admitted to annular space 47 through opening 48. In response to this application of forces the piston head 39 moves rearwardly or upwardly in the cylinder 16, withdrawing rod 32 into the cylinder and lifting foot 37.

A safety lock is provided to avoid inadvertent collapse of an extended leg. The safety lock mechanism includes a bushing 53 rigidly installed in the cylinder 16 at a location near the lower end thereof approximately in the plane of opening 48. A part of the exterior of bushing 53 is threaded. This part is engaged by a complementary threaded end of a sleeve 54 concentric with bushing 53 and projecting substantially beyond the outer end thereof. In the sleeve 54 is a transverse pin 55 which within the sleeve passes through the inner end of a plunger 56. The latter has an enlarged portion slidable in bushing 53 and projecting through such bushing into the annular space 47 in cylinder 16. The inner face of the plunger is formed with an inclined cam surface 57. A compression spring 58 is seated on cross pin 55 and urges the plunger inwardly to limit against the side of piston rod 32. The angle of slope of surface 57 is such that the plunger 56 is longer at one circumferential location than it is another location 180° distant from the first. The portion of shorter length is spaced from the piston rod 32 a distance to allow a ring 59 on the piston rod to pass thereby and in so passing to engage surface 57 and cam the plunger 56 inwardly out of the path of movement of part 59. The latter is fixed to the exterior of rod 32 at a location closer to the inner end thereof than to the outer end and has an external diameter providing for cooperative engagement with the plunger 56 as described. The sleeve 54 is rotatably adjustable on bushing 53 and in the course of such adjustment correspondingly rotates the plunger 56 by virtue of the connection afforded by cross pin 55. With the parts positioned as illustrated the plunger 56 is angularly positioned to give surface 57 an upwardly facing attitude in position to be engaged by ring 59 and cammed aside as the piston rod 32 extends under applied pressure in space 46. As ring 59 passes by the plunger 56, spring 58 returns the plunger outward to reengage the piston rod. At this time, therefore, return motion of the piston rod is limited since the longer length of the plunger to the underside thereof provides an abutment beyond which part 59 cannot move. In the event of a failure of the hydraulic system, therefore, or should the hydraulic leg tend for any other reason to collapse, retracting movement is limited to that necessary to engage ring 59 with the long underside of latch plunger 56. Prior to retracting the extended leg, sleeve 54 is rotated through a distance of approximately 180° to reverse the illustrated position of the plunger 56, that is, to place slope 57 in a generally downwardly facing attitude. Upon retraction of the piston rod under these conditions part 59 is permitted to engage surface 57 and cam the plunger side in the course of its retracting movement. Following retraction or before the next extending operation of the leg, the sleeve 54 is returned to its original position, restoring plunger 56 to the angular position illustrated.

The actuating unit 13 functions as a power generating means, directing hydraulic fluid under pressure to the landing gear legs 11 and 12 alternately above and below the piston head 39 therein or to respective chambers 46 and 47. The actuating unit comprises aligned spaced apart cylinders 61 and 62 differing in diameter in view of the differing maximum volumes of the chambers 46 and 47. The outer ends of the cylinders 61 and 62 are closed so that the cylinders may be considered to be in a back-to-back relation. The outer end of cylinder 61 has a flange 62 welded thereto to which is attached a closure cap 63. In the middle of cap 63 is a threaded opening 64 receiving a nozzle 65 extending from a fitting 66. The fitting 66 is connected by a tube 67 to the inlet fitting 26 of landing gear leg 12, and is connected by a tube 68 to a corresponding fitting on the landing gear leg 11. The outer end of cylinder 62 has a flange 69 welded thereto providing a mounting for a closure cap 71. A central opening 72 in cap 71 receiving a nozzle 73 extending from a fitting 74. A tube 75 extends from fitting 74 to fitting 52 at landing gear leg 12. A like tube 76 extends to a corresponding fitting at landing gear leg 11.

Within cylinders 61 and 62 are reciprocable respective piston means 77 and 78. Each is comprised of a relatively resilient deformable member held between relatively rigid discs, the assembly serving the same end and purpose and functioning in substantially the same manner as piston head 39 of the landing gear legs. The pistons 77 and 78 are attached to opposite respective ends of a shaft 79 which is disposed axially of the cylinders with its opposite ends received in respective cylinders. The piston 77 seats on a shoulder 81 on one end of shaft 79, being clamped thereto by a nut 82. At the other end of shaft 79 piston 78 similarly seats to a shoulder 83 and is there held by a nut 84. The projecting ends of the shaft 79, to which nuts 82 and 84 are secured, may abut respective end caps 63 and 71 to limit endwise motion of the assembly comprising pistons 77, 78 and shaft 79.

In cylinder 13, end cap 63 and piston 77 define an interior chamber 85. This chamber, together with connecting flow lines 67 and 68 and communicating chambers 46 in the landing gear legs 11 and 12 define a first hydraulic circuit bounded at one end by the piston 77 and at the other ends by the upper sides of pistons 39. All parts of the circuit are in continuous communication with one another. In cylinder 62 the end cap 71 and piston 78 define a chamber 86 forming with connections 75 and 76 a continuously communicating hydraulic circuit leading to chambers 47 in the landing gear legs. This circuit is bounded at one end by the piston 78 and at other ends by the underside of the respective pistons 39. Both circuits are filled with hydraulic fluid.

The pistons 77 and 78 are rigidly connected through shaft 79 so that their motion in respective cylinders is simultaneous and in correspondence with one another but in inverse directions. Thus, an advancing or extending motion of piston 77 toward the left as viewed in the drawings or toward end cap 63 is accompanied by a corresponding retracting motion of piston 78 in cylinder 62 away from end cap 71. The chambers 85 and 86 serve as hydraulic reservoirs for their respective circuits. As fluid is expelled from one thereof a proportionate amount of fluid is displaced in the other circuit to return to the other reservoir. This is at least in part a function of the positive extension and retraction of the landing gear legs with the piston head 39 acting directly under the influence of applied pressure in one hydraulic circuit to expel fluid in the other circuit.

The cylinders 61 and 62 are joined into a unitary assembly by an intermediate housing 87, the assembly being fixed to the underside of the trailer body by brackets 88 and 89. A ring 91 welded to what may be considered the inner end of cylinder 61 provides a flange to which a relatively heavy plate 92 is fastened by bolts 93. A similar welded flange 94 on the adjacent end of cylinder 62 provides for attachment of a plate 95 by bolts 96. Plates 92 and 95 are in spaced parallel relation, with the latter having a turned over periphery to be clamped against plate 92 and be held by bolts 93 to make a unitary assembly. In the common axis of cylinders 61 and 62 the plates 92 and 95 have openings accommodating the passage of shaft 79 therethrough. In such openings are thrust bearings 97 and 98. The shaft 79 is formed over a major part of its length between shoulders 81 and 83 with screw threads 99. Mounted to the shaft in threaded engagement therewith is a nut 101. The latter is disposed between plates 92 and 95 and has a relatively thick center portion providing opposing lands 102 and 103 respectively engaging bearings 97 and 98.

The arrangement is one to confine or to restrain nut 101 from bodily longitudinal motion while permitting it freedom of rotary motion. As a result, rotary motion of the nut 101 is resolved into an axial component of motion of shaft 79. The nut 101 is peripherally adapted to be actuated in a rotary sense, as by being formed with gear teeth 104.

The housing 87 as essentially comprised of plates 92 and 95, extends laterally of the aligned cylinders 61 and 62 at one peripheral portion. In such offset portion opposing bearings 105 and 106 are installed in a manner to position a gear 107 therebetween. A shaft 108 extends laterally into the housing 87 through bearings 105 and 106 and has a keyed connection to gear 107. The gear 107 meshes with teeth 104 on nut 101 in a manner rotatively to drive the nut 101 in response to rotation of shaft 108. The latter is connected by transverse pin means 109 to the tubular drive shaft 15 heretofore described as extending from crank 14.

Considering the operation of the landing gear apparatus, the power generating unit 13 is under control of crank 14 and exerts hydraulic pressure in either of opposing directions dependent upon the direction of rotation of the crank. The crank turns shaft 15 which through its extension 108 rotatively drives gear 107 and the driven nut 101. In response to such motion shaft 79 moves in an axial sense either to exetnd piston 77 in cylinder 61 while retracting piston 78 in cylinder 62 or vice versa. The developed hydraulic pressure is transmitted through the connections 67 and 68 or 75 and 76 to the landing gear legs effecting either an extension or retraction of the piston rods 32 therein in the manner described. Reaction to the applied hydraulic pressure is absorbed in the housing 87. Frictional engagement of the threads 99 with corresponding threads in the nut 101 prevent such reaction from being transmitted back through the nut 101 and gear 107 to the crank 14. Accordingly, the resistance to rotation of crank 14 is relatively light, substantially reducing the force required in axially displacing the shaft 79. The parts are shown with piston 77 fully retracted and piston 78 fully extended, a position the parts assume with the landing gear legs fully retracted and feet 37 drawn up for travel. To extend the legs crank 14 is rotated in the appropriate direction to extend piston 77 in cylinder 61 while retracting piston 78 in cylinder 62. The liquid in chamber 85 of cylinder 61 is expelled therefrom and delivered simultaneously to the chambers 46 in the landing gear legs. In response to such applied pressure the piston head 39 in each leg is extended in the cylinder 16 thereof bringing about an extension of rods 32 until feet 37 contact the ground. Continued advance of the piston 77 further increases the pressure in the chambers 46 whereupon cylinder 16 is constrained to lift relatively to piston head 39 and rod 32 and through the connecting bracket 18 to raise trailer body 10. This motion is continued until the trailer body has been raised sufficiently to detach the tractor therefrom whereupon operation of the crank 14 is discontinued. The parts remain so positioned, with hydraulic pressure continuing to be applied to the chambers 46 until the trailer body is to be reattached to a tractor. The safety protection provided by latch plunger 56 is in this period effective to avoid a collapsing leg. In restoring the system to normal for road travel, crank 14 is tuned in the opposite direction. In the initial part of this motion the retracting piston 77 controls descent of the trailer body as the weight of the trailer applies a pressure to return hydraulic fluid from chambers 46 to the reservoir 85. As the weight of the trailer is transferred to the tractor, continuing movement of the shaft 79 results in pressure being applied in reservoir chamber 86 and consequently to be simultaneously applied in the annular chambers 47 in the hydraulic landing legs. In response thereto the pistons 32 are retracted into cylinders 16 and feet 37 lifted for road travel as described. The system lends itself, as will be understood, to use on uneven ground surfaces. Hydraulic fluid expelled from chamber 85 flows to the chambers 46 in whatever volume may be required to engage the respective feet 37 with ground surface.

The latch mechanisms by which plunger 56 is variably positioned in each landing gear leg are interconnected by a common tubular shaft 110. Respective cross pins 111 and 112 connect the shaft 110 to the sleeves 54 associated with the respective legs 12 and 11. The enabling and disabling of both latches thus is a simultaneous operation.

The shaft 15 is supported at its outer end by a plate 113 suitably fixed to the underside of body 10.

As heretofore noted, the invention while having particular reference to landing gear apparatus for semi-trailers has a more general application in hydraulic systems involving an extension and retraction of telescoping piston and cylinder elements. Further, it is apparent that the apparatus lends itself to extensive structural modification without departing from the spirit of the invention as disclosed.

What is claimed is:

1. Apparatus of the class described, including a pair of hydraulic cylinders in an aligned back-to-back relation, adjacent ends of said cylinders being open, a common shaft extending at its opposite ends into respective cylinders through said adjacent ends thereof, piston means in each cylinder attached to a respective end of said shaft, means for actuating said shaft in an axial sense to effect to and fro motion of said piston means, said actuating means including a nut threaded on said shaft between said cylinders peripherally engageable to be rotated, said cylinders providing opposing thrust bearings for said nut restraining it against bodily longitudinal motion whereby rotation of the nut is resolved into axial motion of said shaft, an extending motion of the piston means in one cylinder being accompanied by a retracting motion of corresponding extent of the other piston means in the other cylinder and vice versa, hydraulically extensible and retractable operating means, and connections utilizing the to and fro motion of said piston means positively to apply hydraulic pressure to extend and retract said operating means.

2. Apparatus according to claim 1, characterized by a housing mounted between said cylinders having openings through which said shaft extends and mounting said thrust bearings, said nut being installed in said housing for freedom of rotary motion and restrained by said thrust bearings from bodily longitudinal motion, said shaft having an elongated screw threaded exterior with which said nut interengages, said nut being peripherally engageable to be rotated whereby axially to move said shaft.

3. Apparatus according to claim 2, wherein the periphery of said nut is formed with gear teeth, characterized by a driving gear comprised in said housing meshing with the gear teeth on said nut, and means extending to said housing from the exterior thereof reversibly to rotate said driving gear.

4. Apparatus according to claim 1, wherein said bearings are comprised in a housing intermediate said cylinders, said housing comprising first and second longitudinally spaced apart substantially parallel plates secured to and closing the open ends of respective cylinders, said plates being peripherally joined together, openings in said plates being aligned and having bearing sleeves installed therein through which said shaft passes, said nut being located between said plates and having thrust engagement on its opposite sides with said bearing sleeves.

5. Apparatus according to claim 1 wherein said bearings are comprised in a housing intermediate said cylinders, said housing comprising first and second plates in longitudinally spaced substantially parallel relation respectively closing the open ends of said cylinders, said plates being peripherally joined together, openings in said plates being aligned and having bearing sleeves installed therein through which said shaft passes, said nut being located between said plates and having thrust engagement on its opposite sides with said bearing sleves, said plates being laterally extended and mounting therebetween a gear in the lateral plane of said nut, the periphery of said nut having teeth meshing with said gear, one of said plates having an opening to admit means to rotate said gear.

6. Apparatus according to claim 1, adapted to be suspended beneath the tractor supported end of a semi-truck trailer, characterized in that said operating means is comprised of downwardly projecting landing gear legs spaced laterally of one another to either side of the major axis of the trailer, said pair of hydraulic cylinders being mounted intermediately of said legs, said connections taking the form of couplings between said cylinders and said legs for transmitting fluid under pressure, the means for actuating said common shaft in an axial sense including a housing joining said cylinders into an integrated structure and actuating means in said housing in connected relation to said shaft, said actuating means including a rotatable gear.

7. Apparatus according to claim 6, characterized in that said actuating means further comprises an elongate rod to rotate said gear, said rod at one end being in driving relation to said gear and terminating at its other end in a hand crank to turn said rod.

8. Apparatus according to claim 1, characterized in that said operating means includes at least one assembly comprising telescoping piston and cylinder elements one of which elements is fixed and the other of which relatively extends and retracts, said connections including separate conduits extending from respective hydraulic cylinders to communicate with the interior of the operating means cylinder element at spaced locations above and below the piston element therein, said separate conduits forming with respective communicating spaces in said hydraulic cylinders and in said operating means cylinder element separate circuits of different volume filled with hydraulic fluid, the hydraulic fluid in both circuits being positively displaced by to and fro motion of said piston means in said hydraulic cylinders said hydraulic cylinders being of different diameter conforming to the different volume requirements of said circuits.

9. Apparatus according to claim 1, adapted to be suspended beneath the tractor supported end of a semitruck trailer, characterized in that said pair of hydraulic cylinders are joined together by an intervening housing, the integrated assembly so defined being fixed to the trailer in a position intermediate its sides, the operating means comprising a pair of landing gear assemblies, one to either side of said hydraulic cylinder assembly and including a component fixed to the trailer, said connections including a fluid pressure conducting line extending from each cylinder to both landing gear assemblies for hydraulically induced extending and retracting movements of another component of said assemblies, the means for actuating said common shaft including a reversibly rotatable rod underlying the trailer and accessible for rotation in either direction, said actuating means further including a gear train in said housing driven by rotation of said rod and terminating in a nut mounted to the exterior of said common shaft, said shaft being externally threaded, said housing providing opposing thrust bearings restraining longitudinal bodily motion of said nut.

10. Apparatus according to claim 1, wherein said pair of hydraulic cylinders and associated parts form a power generating unit for the remote actuation of said operating means, said operating means including at least one assembly providing a pressure chamber of relatively large maximum volume for extension of said operating means and in opposition thereto a pressure chamber of smaller maximum volume for retraction of said operating means, the hydraulic cylinders of said power generating unit differing in diameter in accordance with the different pressure fluid requirements of said chambers.

11. Apparatus of the class described, including a pair of hydraulic cylinders in an aligned back-to-back relation, adjacent ends of said cylinders being open, a common shaft extending at its opposite ends into respective cylinders through said adjacent ends thereof, piston means in each cylinder attached to a respective end of said shaft, rotatable means for actuating said shaft in an axial sense to effect to and fro motion of said piston means, an extending motion of the piston means in one cylinder being accompanied by a retracting motion of corresponding extent of the other piston means in the other cylinder and vice versa, hydraulically extensible and retractable operating means, connections utilizing the to and fro motion of said piston means positively to apply hydraulic pressure to extend and retract said operating means, said operating means including at least one assembly comprising telescoping piston and cylinder elements one of which elements is fixed and the other of which relatively extends and retracts, said connections including separate conduits extending from respective hydraulic cylinders to communicate with the interior of the operating means cylinder element at spaced locations above and below the piston element therein, said separate conduits forming with respective communicating spaces in said hydraulic cylinders and in said operating means cylinder element separate circuits filled with hydraulic fluid, the hydraulic fluid in both circuits being positively displaced by to and fro motion of said piston means in said hydraulic cylinders, and interengageable means on said piston and cylinder elements to lock said other element in an extended position, said interengageable means including a cylinder mounted member in the form of a latch spring biased to project an inner end thereof laterally into the cylinder element in the path of movement of a piston mounted member comprised in said interengageable means, said latch having an outer portion projecting outside said cylinder element, said outer portion being accessible manually to rotate said latch, said inner end of said latch having a sloping cam surface variably adjusted by rotation of the latch into and out of a position to be engaged by said piston mounted member, said latch in one angular position of adjustment allowing an extending motion of the piston element during which the piston mounted member cams aside said latch in projecting to a position beyond the latch, the latch in another angular position of adjustment allowing itself to be cammed aside by the piston mounted member in a retracting movement of the piston element, the latch accordingly being enabled and disabled by selective rotary adjustment thereof.

12. Apparatus according to claim 11, wherein there is a pair of assemblies each comprising piston and cylinder elements as set forth, characterized by adjustable means having a common connection to the latch in each assembly whereby the enabling and disabling of said latches is a simultaneous operation.

13. Apparatus of the class described, including a pair of hydraulic cylinders in an aligned back-to-back relation, a common shaft concentric with said cylinders and extending at its opposite ends into respective cylinders through adjacent ends thereof, piston means in each cylinder attached to said shaft, a nut installed between said adjacent ends of said cylinders for freedom of rotary motion and restrained from bodily longitudinal motion, said nut having a screw threaded mounting on said shaft and being rotatable whereby axially to move said shaft, an extending motion of the piston means in one cylinder being accompanied by a retracting motion of corresponding extent of the other piston means in the other cylinder and vice versa, and reversibly rotatable means connected simultaneously to rotate said nut.

14. Apparatus according to claim 13, characterized by a housing mounted between and interconnecting said cylinders through which said shaft extends and within which said nut is installed, said reversible rotatable means including a part in said housing in driving relation to said nut and a rotatable shaft entering said housing from the exterior thereof to operate said part.

15. Apparatus according to claim 13, characterized by hydraulic flow ports in the opposite ends of said cylinders interconnected in a hydraulic operating circuit, the circuit including the opposite end portions of said cylinders in advance of said pistons being filled with a hydraulic fluid so that a pressure responsive means in said circuit may appropriately respond to axial motion of said shaft.

16. Apparatus according to claim 15, wherein adjacent ends of said cylinders are open to pass said shaft therethrough, opposite ends being closed, characterized by longitudinally spaced apart plates closing respective adjacent ends of said cylinders and having aligned small diameter openings for passage of said shaft therethrough, bearings installed in said openings, said bearings presenting opposing thrust surfaces perpendicular to the axis of said shaft, said nut being installed between said plates and having a mid portion in common contact with the thrust surfaces of said bearings.

17. Apparatus according to claim 16, characterized in that said plates are extended to project radially of said cylinders over at least a part of the circumference thereof, said reversibly rotatable means including a gear relatively rotatably mounted between extended portions of said plates in parallel relation to said nut and peripherally meshing with said nut, and an operating rod having one end in driving relation to said gear, said rod being disposed in a parallel relation to said shaft externally of said cylinders and adapted for reversible rotation about its axis, the opposite end of said rod being accessible for remote rotary positioning of said nut.

References Cited

UNITED STATES PATENTS

| | | | |
|---|---|---|---|
| 1,886,936 | 11/1932 | Bowen | 60—54.5 XR |
| 1,723,789 | 8/1929 | Kirkbride. | |
| 2,274,821 | 3/1942 | Bloxsom | 60—54.6 XR |
| 2,585,389 | 2/1952 | Kehrl | 60—54.5 |
| 2,970,442 | 2/1961 | Taylor | 60—54.5 XR |
| 3,013,624 | 12/1961 | De Remer et al. | |
| 2,286,661 | 6/1942 | Warner | 60—54.5 XR |
| 2,692,571 | 10/1954 | Hardy | 60—54.5 XR |
| 3,171,380 | 3/1965 | Kuhn | 60—54.5 XR |

FOREIGN PATENTS 712,918    8/1954    Great Britain.

MARTIN P. SCHWADRON, Primary Examiner

R. R. BUNEVICH, Assistant Examiner

U.S. Cl. X.R.

60—54.5, 54.6; 74—89.15; 92—31, 138